United States Patent Office 3,416,603
Patented Dec. 17, 1968

3,416,603
CONSOLIDATION OF SUBTERRANEAN FORMATIONS
George G. Bernard, Fullerton, Calif., assignor to Union Oil Company of California, Los Angeles, Calif., a corporation of California
No Drawing. Filed Oct. 20, 1966, Ser. No. 587,967
14 Claims. (Cl. 166—33)

ABSTRACT OF THE DISCLOSURE

A method for consolidating an incompetent earth formation surrounding a well wherein a liquid resin-forming material is injected into the well, then an inert gas is injected into the well at a pressure sufficient to force the resin-forming material from the well into the formation, and thereafter inert gas is passed through the formation to displace the excess of the resin-forming material from the portion of the formation to be consolidated prior to the material undergoing substantial hardening.

---

This invention relates generally to the treatment of incompetent subterranean formations, and more particularly to an improved method for consolidating incompetent earth formations. Specifically, the invention relates to a method of consolidating incompetent or substantially incompetent earth masses, such as loose sands surrounding oil or water wells, while retaining a substantial degree of permeability for the consolidated mass.

Recoverable fluids, such as petroleum oil, gas and water, are frequently found in subterranean formations comprising unconsolidated or loosely consolidated sand and sandstone. When such incompetent formations are pierced by a well bore and the connate fluids therein removed, the loose or weakly bound sand particles become dislodged and are entrained in the fluid. Some of the dislodged sand accumulates in the well bore and other flow areas causing plugging and reduced fluid flow, while other of the sand is carried to the surface with the withdrawn fluid. These entrained particles cause severe erosion of underground strainers and liners, the producing string, pressure control valves, pumps and flow lines. Substantial quantities of the entrained sand are deposited in field storage tanks causing cleaning and disposal problems. In extreme cases, sufficient sand can be removed from the producing formation to create large underground voids, or cavities, which can collapse under the overburden pressure causing damage to the well. Thus, fluid production from incompetent subterranean formations can result in restricted flow and increased production and well maintenance costs, unless the entrainment of said from the formation can be controlled or completely eliminated.

Various sand control measures, including a number of consolidation methods, have been employed in an effort to contain incompetent sand within a producing formation. The consolidation of subterranean fluid producing formations with resin or plastic binders has been previously proposed. In general, the prior art resin consolidation methods comprise the injection of a resin-forming monomer or prepolymer, or a liquid solution of these materials, directly into the formation. These resin-forming materials are conventionally referred to in the well treating art as resins or plastics even though they have not been cured to a resinous state prior to injection. The resin monomer or prepolymer is then polymerized, or hardened, by the effect of temperature alone, or a curing agent can be admixed with the liquid resin or resin solution to catalyze the polymerization reaction. Alternatively, the curing agent can be separately injected as a second solution either preceding or following the injection of the resin.

Substantial difficulties are encountered in consolidating incompetent fluid producing formations according to the various prior art techniques. For example, great care must be exercised in controlling the injection of reactants to assure that sufficient strength is imparted to the earth mass adjacent the well to effectively eliminate entrainment of sand from the formation, without causing plugging to the extent that the formation is rendered fluid impermeable. The injection of excess resin, either as a liquid concentrate or in dilute solution, can cause the pore spaces between earth particles to become partially or completely filled with resin effecting a severe reduction in the fluid permeability of the consolidated formation. Plugging of the formation immediately adjacent to the well is especially critical because flow velocities necessarily are higher due to the geometry of the producing formation. Thus, most of the prior art plastic consolidation methods include a step of injecting a nonreactive afterflush immediately following the resin injection to displace excess resin-forming materials from the interstices between earth particles in the consolidation zone, thereby attempting to prevent plugging in the critical area immediately adjacent the well. However, efforts to retain permeability have in many cases been unsatisfactory as the consolidated formation, or producing zones of the formation do, in fact, suffer substantial permeability reduction, and/or sufficient strength may not be imparted to the consolidated formation to eliminate sand entrainment.

Accordingly, it is an object of the present invention to provide an improved method of consolidating incompetent earth formations. Another object is to provide an improved method of consolidating incompetent earth formations with hardenable resins. Still another object is to provide a resin consolidation process by which an incompetent earth formation can be consolidated without substantial reduction in the permeability of the consolidated formation. A further object is to provide an improved method of removing excess resin-forming material from the formation to be consolidated prior to curing of the resin. A still further object is to provide a resin consolidation process in which the permeability of the formation to be consolidated is established prior to hardening of the resin. Other objects and advantages of the invention will be apparent to those skilled in the art from the description which follows.

Briefly, the invention comprises a method of consolidating incompetent earth formations whereby substantial permeability is established in the consolidation zone prior to hardening of the resin into a consolidated mass. Permeability is established by passing an inert gas into the formation following the resin injection so as to displace excess resin from the consolidation zone further into the formation before substantial polymerization of the injected resin occurs, thereby leaving a thin residue or coating of resin on the earth particles in the injection zone. On subsequent curing, the formation adjacent the well bore is consolidated into a permeable mass exhibiting high strength and resistance to entrainment of earth particles into the well. In a preferred embodiment of the invention, the inert gas is injected immediately following the resin injection so as to displace the resin from the well into the formation.

It has been found that by this special technique, incompetent earth formations can be treated to convert them into consolidated masses having a high degree of porosity. The method of this invention is particularly suited for the treatment of formations surrounding injection wells or production wells for the recovery of petroleum from a petroleum reservoir. This method may also be used in consolidating formations surrounding mine shafts or in consolidating earth formations for filtration purposes.

Not only does the consolidation of incompetent formations by the method of this invention result in the consolidated formation exhibiting higher permeability, but consolidation by the preferred method of injecting the inert gas immediately following the resin affords additional advantages, such as the elimination of the use of a displacement fluid which can adversely affect the curing of the resin, or effect removal of too much resin from the critical area adjacent the well, Further, where the resin is displaced into the formation with inert gas so as to deposit only a thin coating of resin on the earth particles with excess resin being displaced further into the formation, only sufficient resin-forming material need be injected to coat the earth particles to the depth of penetration desired. Thus, not only is the required quantity of resin reduced, but this reduction in the amount of resin injected further contributes to the higher permeability of the formation consolidated by this preferred technique.

Any of the conventional sand consolidation plastics can be employed in the method of this invention. For example, one such material comprises a phenol-formaldehyde type resin formed by the reaction of formaldehyde or formalin with an aryl hydroxy compound, such as phenol or cresol, in the presence of a catalyst. Another type of resinous material suitable for use in the consolidation of incompetent earth formations are epoxy resins, such as the diglycidyl ethers of bisphenol A obtained by reacting epichlorohydrin with bisphenol A in the presence of a caustic such as sodium or potassium hydroxide. Still another type of epoxy resin useful for such consolidation and which can be injected by the method of this invention is epoxy novolac resin formed by the condensation of epichlorohydrin with polynuclear polyhydroxy phenols.

The resin-forming material, such as one of the aforementioned specifically disclosed plastics, is injected in liquid phase, in conventional manner. As heretofore disclosed, this liquid can comprise a mixture of the resin-forming monomer or prepolymer and a suitable polymerization catalyst, or the catalyst can be injected separately, either prior to or following the resin. The resin mixture can also contain other special ingredients, such as accelerators and the like to compensate for variations in the formation temperature. It is also often advantageous to dissolve these materials in a solvent, to improve the injectivity of the resin-forming liquid.

When the unconsolidated mass contains connate water, i.e., liquid water adhering to the earth particles due to capillary forces, and/or hydrocarbons such as oil, as is usually the case with petroleum sands, it is generally desirable to first remove such connate water and hydrocarbons before contacting the mass with the resin-catalyst mixture. A preferred technique for removing the water includes treatment of the mass with water-removing fluids such as, for example, oxygenated hydrocarbon compounds containing at least one keto-oxygen and/or hydroxyl group. Examples of such materials include, among others, isopropyl alcohol, n-propyl alcohol, secondary butyl alcohol, acetone, methylethyl ketone, and the like, and mixtures of these water-removing fluids. One particularly preferred oxygenated hydrocarbon is isopropyl alcohol. Usually the water and oil are adequately removed by the injection of a water and oil miscible liquid such as a lower alcohol but, in some cases, it is desirable to precede the alcohol slug with a slug of liquid hydrocarbon such as diesel.

In treating incompetent subterranean earth formations according to my invention, any convenient method of injecting fluids into the zone to be consolidated can be utilized. The choice of injection technique will depend primarily on the type and placement of subsurface casings, liners and tubing strings, the type of production equipment, the injection equipment available to the operator, and the experience of the operator. Conventionally, the zone to be treated is isolated by setting mechanical packers in the well bore above and below the consoliration zone. The vertical depth of formation to be consolidated can be controlled by the spacing between these packers. Generally, the zone to be treated can comprise a formation from about 2 to about 50 feet in vertical thickness, although it is preferred to treat a zone having a thickness of not more than 10 feet in a single injection step. Treatment of successive vertical layers of formation may be desirable in the case where a thick zone of incompetent sand is to be consolidated.

Because of the expense and time required to treat an incompetent formation, consolidation of only sufficient sand immediately adjacent the well bore to prevent displacement of the loose sand particles is preferred. Consolidation of the incompetent zone to a lateral distance of from about 1 to about 10 feet from the well bore is usually adequate; although, in any particular formation, consolidation to a greater horizontal penetration can be advantageous. In most applications, consolidation to a horizontal distance of from about 3 to about 6 feet from the well is preferred. Although the preferred configuration of the consolidated zone can be defined as a cylinder symmetrically oriented about the well bore, because of differences in permeability, and because of differences in the vertical and horizontal injectivity profile, and due to the effect of hydrostatic head, the actual consolidated zone will be somewhat irregular in shape. The assumption that the consolidated zone is a regular cylinder having a height equal to the desired depth of penetration is sufficiently accurate for computation of the required treating volumes, and for related purposes. The volume of fluid required to fill the consolidation zone is the pore or interstitial volume defined by this cylinder.

The gaseous displacement fluid injected in the practice of this invention can comprise any inert gaseous material which remains substantially uncondensed at injection conditions of pressure and temperature. For the purpose of this invention, an inert gas is defined as a gaseous substance which is substantially unreactive with either the injected fluids or the earth materials at formation conditions. Accordingly, such gases as nitrogen and helium are particularly preferred in the practice of this invention. Carbon dioxide is also useful, particularly at lower injection pressures. Another inert gas useful as displacement fluid is flue or exhaust gas having a relatively low oxygen content. Air can also be employed as displacement fluid. Also, various low molecular weight hydrocarbon gases, such as methane, ethane and propane, can be employed in the practice of this invention. The displacement fluid can comprise any of the aforementioned gases, or mixtures of these gases with each other, or with other gaseous substances.

It is only necessary that sufficient of these gases be injected to displace excess resin into the formation, thereby establishing permeability in the consolidation zone prior to hardening of the resin. In a typical formation treatment, permeability can usually be achieved with a gas injection of between about 10 and about 100 pore volumes based on the volume of the consolidation zone.

The gaseous displacement fluid must be injected at a pressure sufficient to cause it to pass into and through the resin-containing formation, displacing excess resin therefrom. In a preferred application, the gaseous displacement fluid is injected under a pressure elevated sufficiently to displace the resin-forming material from the well into the formation and to cause the gas to pass thereinto.

Recommended practice with some of the commercially available consolidation plastics includes pretreatment of the formation with an aromatic solvent immediately prior to the resin injection. Accordingly, where desired, the method of this invention includes the optional step of contacting the formation particles with an aromatic solvent prior to injection of the resin.

Thus, a specific mode of practicing the method of this invention for consolidating incompetent petroleum bearing earth formations comprises (1) the injection of a volume of hydrocarbon liquid, such as diesel, through the well bore and into the formation surrounding the well bore; (2) next injecting a quantity of an oxygenated hydrocarbon liquid; (3) injecting a quantity of aromatic solvent; (4) injecting a volume of liquid resin-forming material; and (5) displacing these fluids from the well into the formation with an inert gaseous displacement fluid injected in sufficient quantity to displace excess resin from the well and from the formation immediately adjacent to the well so as to establish the formation permeability prior to hardening the resin. The well is then maintained shut in for sufficient time to permit curing of the resin, whereupon production can be resumed in conventional manner. The specific quantities of wash solution employed are a matter of choice depending upon the particular application, but usually the volume of the diesel and the oxygenated hydrocarbon solvent washes is between about 1.0 and 5.0 pore volumes.

The improved consolidation method of this invention is demonstrated by the following examples which are presented by way of illustration, and are not intended as limiting the spirit and scope of the invention as defined by the appended claims.

Example 1

The following experiment demonstrates the permeability reduction that can result from the resin treatment of an incompetent sand formation. In this experiment, a glass tube is packed with a relatively large grain sand. The sand pack is saturated with water and then with oil to simulate an oil-bearing sand formation. The restored core contains 79 percent water and 21 percent oil.

Conventional resin consolidation is simulated by sequentially passing a volume of isopropyl alcohol and a volume of benzene through the core. Next a volume of an epoxy resin-catalyst mixture, marketed by the Hysol Corporation of Olean, New York, is injected into the core and allowed to cure for about 16 hours. The sand is hardened into a consolidated mass exhibiting relatively high compressive strength. However, the air permeability of the consolidated core is reduced to zero.

Example 2

The experiment of Example 1 is repeated except that the core is further treated with three volumes of diesel immediately after the resin injection to displace excess resin therefrom so as to improve the permeability of the consolidated core. Following the diesel injection, the treated core is cured by the method of Example 1. The core treated in the foregoing manner exhibits an air permeability of 3.3 darcies.

Example 3

Resin consolidation of an incompetent formation employing the improved technique of this invention is demonstrated by the following experiment. A sand core is prepared by the method of Example 1, and restored by saturation with water and then oil. The restored core is then treated with a volume of isopropyl alcohol, a volume of benzene, and an epoxy resin-catalyst mixture injected in conventional manner. However, a volume of air is passed through the core immediately following the resin injection and prior to the injected resin being hardened to any substantial extent. The treated core is then cured in conventional manner for about 16 hours. The incompetent core consolidated in the foregoing manner exhibits an air permeability of 30 darcies and good strength.

While particular embodiments of the invention have been described, it will be understood, of course, that the invention is not limited thereto since many modifications can be made and it is intended to include within the invention any such modifications as fall within the scope of the claims.

The invention having thus been described, I claim:

1. A method for consolidating an incompetent earth formation surrounding a well, which comprises:
    injecting a liquid resin-forming material into said well;
    thereafter injecting an inert gas into said well under sufficient pressure to displace said resin-forming material from said well into said formation;
    continuing the injection of said inert gas into said well to cause said gas to enter into and pass through said formation in an amount sufficient to displace the excess of said resin-forming material from the portion of the formation to be consolidated prior to said material undergoing substantial hardening; and
    curing said resin-forming material to obtain a permeable consolidated earth mass.

2. The method defined in claim 1 wherein said inert gas is substantially uncondensed at formation conditions of temperature and pressure.

3. The method defined in claim 1 wherein said inert gas is selected from the group consisting of nitrogen, helium, carbon dioxide, flue gas, air, and low molecular weight hydrocarbon gases.

4. The method defined in claim 1 wherein from about 10 to about 100 volumes of said inert gas is injected into said formation per pore volume of the portion of the formation that is to be consolidated.

5. The method defined in claim 1 including the step of treating said formation prior to the injection of said resin-forming material to remove water.

6. The method defined in claim 1 wherein the formation is consolidated to the extent of about 1 to 10 feet laterally from the well.

7. A method for consolidating an incompetent petroleum-bearing formation penetrated by a well through which petroleum is withdrawn, which comprises:
    sequentially injecting the following fluids into said well,
    (1) a liquid hydrocarbon,
    (2) an oxygenated liquid hydrocarbon,
    (3) a liquid resin-forming material, and
    (4) an inert gas at a pressure sufficient to displace said resin-forming material from said well and into said formation and in a quantity sufficient to displace the excess of said material from the portion of the formation to be consolidated prior to said material undergoing substantial hardening; and
    closing said well to permit said resin-forming material to harden so as to obtain a permeable consolidated earth mass.

8. The method defined in claim 7 wherein said inert gas is selected from the group consisting of nitrogen, helium, carbon dioxide, flue gas, air, and low molecular weight hydrocarbon gases.

9. The method defined in claim 7 wherein between about 10 and about 100 volumes of said inert gas is injected into said formation per pore volume of the portion of the formation that is to be consolidated.

10. The method defined in claim 7 wherein said resin-forming material is epoxy resin.

11. The method defined in claim 7 wherein the liquid hydrocarbon is diesel oil and is injected in sufficient quantity to displace substantially all the petroleum from the portion of the formation to be consolidated.

12. The method defined in claim 7 wherein the oxygenated liquid hydrocarbon is selected from the group consisting of isopropyl alcohol, n-propyl alcohol, secondary butyl alcohol, acetone, methylethyl ketone and mixtures thereof, and is injected in sufficient quantity to displace substantially all the connate water from the portion of the formation to be consolidated.

13. The method defined in claim 7 including the additional step of injecting an aromatic solvent into said well after step (2) and before step (3).

14. The method defined by claim 7 wherein the formation is consolidated to the extent of about 1 to about 10 feet laterally from said well.

References Cited

UNITED STATES PATENTS

| | | | |
|---|---|---|---|
| 2,378,817 | 6/1945 | Wrightsman et al. | 166—33 |
| 3,121,463 | 2/1964 | Perry | 166—33 |
| 3,176,768 | 4/1965 | Brandt et al. | 166—33 |
| 3,223,161 | 12/1965 | Burge | 166—33 |
| 3,294,168 | 12/1966 | Bezemer et al. | 166—33 |
| 3,330,350 | 7/1967 | Maly | 166—33 |

CHARLES E. O'CONNELL, *Primary Examiner.*

I. A. CALVERT, *Assistant Examiner.*